(12) United States Patent
Park et al.

(10) Patent No.: US 6,955,248 B2
(45) Date of Patent: Oct. 18, 2005

(54) COMBINATION TYPE DAMPER AND WASHING MACHINE HAVING THE SAME

(75) Inventors: Gwan-Ryong Park, Seoul (KR); Cha-Seung Jun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/754,610

(22) Filed: Jan. 12, 2004

(65) Prior Publication Data

US 2004/0173421 A1  Sep. 9, 2004

(30) Foreign Application Priority Data

Mar. 6, 2003 (KR) .................. 10-2003-0014091
Mar. 26, 2003 (KR) .................. 2003-0018966

(51) Int. Cl.$^7$ ............................................. F16F 15/03
(52) U.S. Cl. .................... 188/267; 188/129; 188/267.1; 267/196; 267/134
(58) Field of Search ............... 188/267, 267.1, 188/267.2, 129; 267/196, 134

(56) References Cited

U.S. PATENT DOCUMENTS 5,392,881 A * 2/1995 Cho et al. ................ 188/267
5,549,182 A * 8/1996 Ehrnsberger et al. ....... 188/129
6,202,806 B1 * 3/2001 Sandrin et al. .......... 188/267.1
6,378,671 B1 * 4/2002 Carlson ................. 188/267.2

FOREIGN PATENT DOCUMENTS

EP   0 965 675 A    12/1999
WO   WO01/273375 A   4/2001

* cited by examiner

Primary Examiner—Matthew C. Graham
(74) Attorney, Agent, or Firm—Birch, Stewart, Kolasch & Birch, LLP

(57) ABSTRACT

Disclosed are a combination type damper and a washing machine having the same. The combination type damper comprises: a cylinder provided with a receiving space having a certain depth at one side thereof; a rod relative-movably inserted into the receiving space of the cylinder; and a composite damping means for generating a damping force by an electromagnetic force when a displacement of a relative movement of the cylinder and the rod is less than a preset length, and for generating a frictional damping force when the displacement of the relative movement is more than the preset length. Transient state vibration and steady state vibration generated from a tub assembly during the entire processes for washing laundry are prevented from being transmitted to a cabinet, thereby minimizing vibration noise towards outside while using the washing machine.

15 Claims, 3 Drawing Sheets

COMBINATION TYPE DAMPER AND WASHING MACHINE HAVING THE SAME

This Nonprovisional application claims priority under 35 U.S.C. § 119(a) on Patent Application No(s). 2003-0014091 and 2003-0018966 filed in Korea on Mar. 6, 2003 and Mar. 26, 2003, respectively, the entire contents of which are hereby incorporated by reference.

BACKGROUND OF THE INVENTION

1. Field of the Invention

The present invention relates to a combination type damper and a washing machine having the same, and more particularly, to a combination type damper capable of minimizing a vibration transmission to other components by effectively absorbing steady state vibration and transient state vibration by using an electromagnetic force and a frictional damping force, and a washing machine having the same.

2. Description of the Conventional Art

Generally, a washing machine washes laundry by performing a washing operation, a rinsing operation, and a dehydration operation. Washing methods of the washing machine include a method for washing laundry accordingly as vortex generated when a washing bar having blades is rotated in the middle of a laundry basin applies an impact to laundry, a method for washing laundry accordingly as vortex generated when a rotation blade mounted at a lower portion of a laundry basin is rotated applies an impact to laundry, a method for washing laundry by an impact that laundry drops by rotating a drum in which laundry is put in a horizontal direction, and etc.

FIG. 1 is a front section view showing one embodiment of a general washing machine.

As shown, the washing machine comprises: a cabinet 100 having an inner space of a predetermined shape; a tub 210 positioned in the cabinet 100; a drum 220 rotatably inserted into the tub 210 and through which laundry is introduced; a driving motor 230 mounted at a rear surface of the tub 210 for rotating the drum 220; a spring 110 mounted between the cabinet 100 and an upper portion of the tub 210 for elastically supporting the tub 210; a damper 300 mounted between the cabinet 100 and a lower portion of the tub 210 for absorbing vibration; a water supply means (not shown) for supplying washing water into the tub 210; a drain means (not shown) for draining water inside the tub 210; and a door (not shown) for opening and closing the drum 220.

The tub 210, the drum 220, and the driving motor 230 constitute one tub assembly 200, and the tub assembly 200 is supported by the damper 300 and the spring 110.

For a washing operation in the washing machine, first, the door is opened thus to put laundry into the drum 220, then the door is closed, and detergent and washing water are put into the drum, thereby rotating the drum 220 by a driving of the driving motor 230. After the washing operation, a rinsing operation is performed and then washing water is drained by the drain means. Then, a dehydration operation that washing water remaining on the laundry is removed by a centrifugal force accordingly as the drum 220 is rotated with a high speed is performed.

In a general washing machine, vibration is generated in the tub assembly at the time of a washing operation or a dehydration operation, and the vibration is absorbed by the spring 110 and the damper 300 thus to be prevented from being transmitted to the cabinet 100.

If vibration generated from the tub assembly 200 is transmitted to the cabinet 100, great vibration noise is generated at the cabinet 100, which causes uncomfortable feeling and degrades a reliability of a product. Accordingly, minimizing vibration noise is a great task.

FIG. 2 is a front section view showing a damper constituting the washing machine by partially cutting. As shown, the damper 300 comprises: a first body 310 having one side relative-movably coupled to the tub 210 and having a frictional surface 311 of a cylindrical shape at an inner portion of another side thereof; a second body 320 having one side relative-movably coupled to the cabinet 100 and having another side inserted into the frictional surface 311 of the first body 310; and a frictional member 330 fixedly coupled to the second body 320 to be in contact with the frictional surface 311 of the first body for generating a frictional force at the time of moving. Also, a guide bush 340 for blocking a gap between the first body 310 and the second body 320 is coupled to an inlet of the frictional surface 311 of the first body 310.

The frictional member 330 is formed of generally grease impregnation sponge with a ring shape having a certain thickness and length, and a coupling groove 321 having a certain depth and length is formed at the outer circumferential surface of the second body 320 at one side thereof. The frictional member 330 is inserted into the coupling groove 321 of the second body. The outer circumferential surface of the frictional member 330 comes into contact with the inner circumferential surface of the first body 310, that is, the frictional surface 311.

In the damper 300, when vibration generated from the tub assembly 200 is transmitted, the first body 310 and the second body 320 perform a relative movement. That is, the second body 320 moves towards a straight line direction and thereby the frictional member 330 is moved together. According to this, a constant friction is generated between the outer circumferential surface of the frictional member 330 and the frictional surface 311 of the first body, thereby absorbing vibration transmitted from the tub assembly 200.

However, in the washing machine, a degree of vibration generated from the tub assembly 200 is different in an entire process for washing laundry. Therefore, by the damper 300 which generates a constant frictional force, steady state vibration and transient state vibration having various widths can not be sufficiently absorbed.

That is, steady state vibration is generated at the time of a dehydration operation of a normal state of a high speed or at the time of a washing operation or a normal state, and transient state vibration is generated in a process for reaching the normal dehydration operation of a high speed or for stopping at the normal high speed dehydration operation. Therefore, even if transient state vibration can be absorbed to some degree by the constant frictional force of the damper, steady state vibration is transmitted to the tub assembly 200 and the cabinet 100 thus to generate vibration noise outwardly.

SUMMARY OF THE INVENTION

Therefore, an object of the present invention is to provide a combination type damper capable of minimizing a vibration transmission to other components by effectively absorbing steady state vibration and transient state vibration by using an electromagnetic force and a frictional damping force, and a washing machine having the same.

To achieve these and other advantages and in accordance with the purpose of the present invention, as embodied and broadly described herein, there is provided a combination type damper comprising: a cylinder provided with a receiving space having a certain depth at one side thereof; a rod relative-movably inserted into the receiving space of the cylinder; and a composite damping means for generating a damping force by an electromagnetic force when a displacement of a relative movement of the cylinder and the rod is less than a preset length, and for generating a frictional damping force when the displacement of the relative movement is more than the preset length.

To achieve these and other advantages and in accordance with the purpose of the present invention, as embodied and broadly described herein, there is also provided a washing machine having a combination type damper in a washing machine comprising a cabinet having an inner space of a predetermined shape; and a tub positioned inside the cabinet and for containing washing water, the washing machine having a combination type damper comprising: a cylinder provided with a receiving space having a certain depth at one side thereof and having another side coupled to a cabinet or a tub; a rod of which one side is relative-movably inserted into the receiving space of the cylinder and another side is coupled to the cabinet or the tub; and a composite damping means for generating a damping force by an electromagnetic force when a displacement of a relative movement of the cylinder and the rod is less than a preset length, and for generating a frictional damping force when the displacement of the relative movement is more than the preset length.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, a combination type damper and a washing machine having the same according to the present invention will be explained in more detail.

Figure 1:
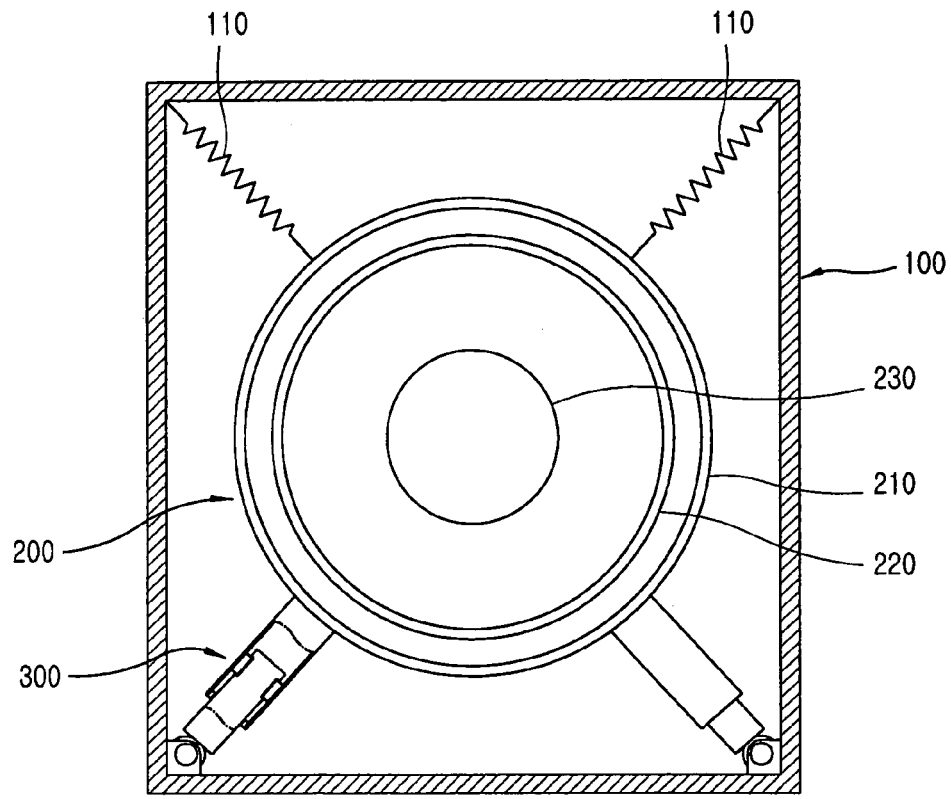
FIG. 1 is a front section view showing one embodiment of a general washing machine.
Figure 2:
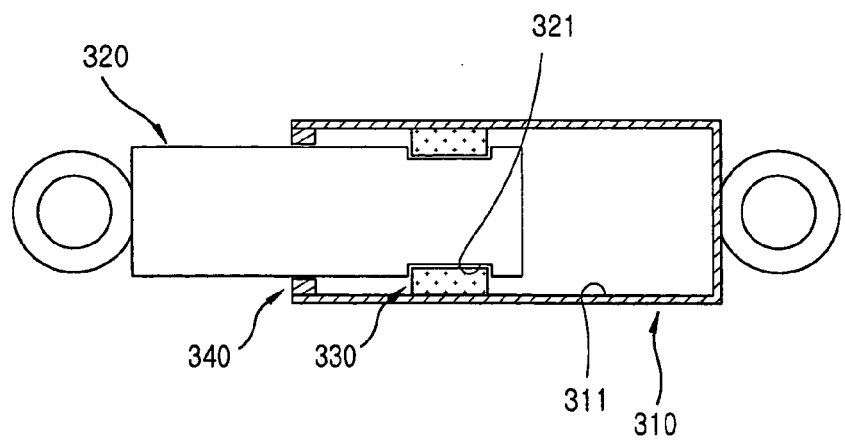
FIG. 2 is a front section view showing a damper constituting the washing machine.
Figure 3:
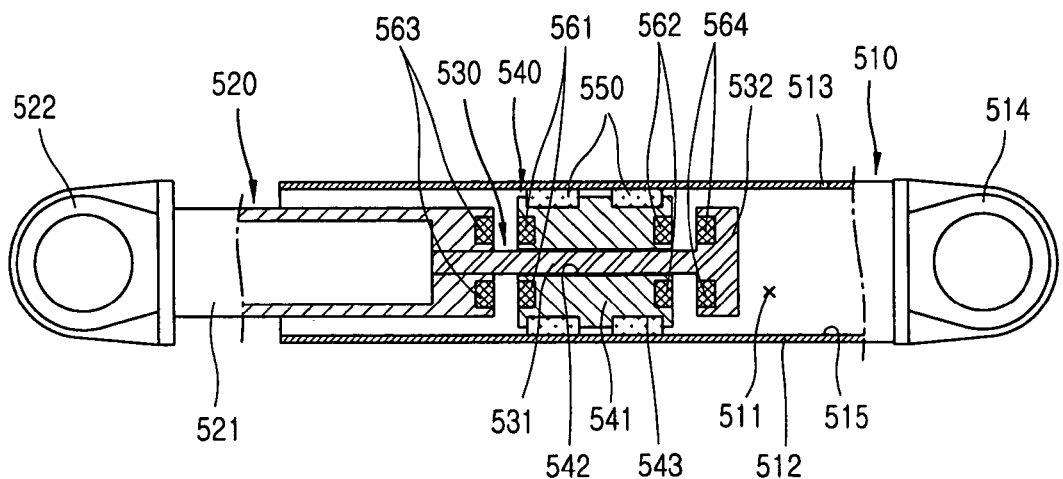
FIG. 3 is a front section view showing one embodiment of a combination type damper of the present invention.

FIG. 3 is a front section view showing one embodiment of the combination type damper of the present invention.

As shown, the combination type damper comprises: a cylinder 510 provided with a receiving space 511 having a certain depth at one side thereof; a rod 520 relative-movably inserted into the receiving space 511 of the cylinder; and a composite damping means for generating a damping force by an electromagnetic force in case that a displacement of a relative movement of the cylinder and the rod is less than a preset length when the cylinder and the rod perform a relative movement, and for generating a frictional damping force when the displacement of the relative movement is more than the preset length.

The cylinder 510 comprises a body portion 512 with a certain length; a receiving space 511 of a cylindrical shape having a certain depth in a longitudinal direction at one side of the body portion 512; a penetration hole 513 connected to the receiving space 511 at the outer circumferential wall of the body portion 512; and a coupling portion 514 formed at another side of the body portion 512. The inner circumferential surface of the receiving space 511 forms a frictional surface 515.

A coupling portion 522 is formed at one side of the cylindrical body portion 512 having a certain length and outer diameter thus to constitute the rod 520.

The composite damping means includes: a guide bar 530 provided at the rod 520; a slider 540 slidably inserted into the guide bar 530; a frictional member 550 coupled to the slider 540 and adhered to the inner circumferential surface of the cylinder 510; and magnetic pairs for generating a repulsive force at the time of movement of the slider 540.

The guide bar 530 is composed of a guide portion 531 having an outer diameter smaller than that of the cylindrical body portion 521 of the rod and having a certain length, and a stopper 532 extendingly formed at one end of the guide portion 531. The guide bar 530 is provided at the end of the cylindrical body portion 521 of the rod. The guide bar 530 can be integrally formed with the rod 520, or can be separately manufactured thus to be coupled to the rod 520.

The slider 540 includes: a cylindrical body 541 having a certain length and an outer diameter smaller than an inner diameter of the receiving space 511 of the cylinder; an axis insertion hole 542 formed in the middle of the cylindrical body 541 for slidably inserting the guide bar 530; and a coupling groove 543 formed at the outer circumferential surface of the cylindrical body 541.

The slider 540 is coupled to the guide bar 530 in a state that the guide portion 531 of the guide bar 530 is inserted into the axis insertion hole 542, and is positioned between the end surface of the rod 520 and the stopper 532 of the guide bar.

The frictional member 550 is formed as a ring shape having a certain thickness and length. The frictional member 550 is coupled to the coupling groove 543 of the slider with a state of being adhered to the frictional surface 515 of the receiving space of the cylinder. Herein, when a relative motion distance between the cylinder 510 and the rod 520, that is, a displacement is more than a preset distance, a frictional damping force operates between the frictional member 550 and the frictional surface 515.

The magnetic pairs are composed of fixed side magnets coupled to the slider 540, and movable side magnets coupled to the guide bar 530 and the rod 520.

The fixed side magnets are composed of a first magnet 561 coupled to one side end of the slider 540, and a second magnet 562 coupled to another side end of the slider 540.

The first magnet 561 and the second magnet 562 are positioned at both ends of the slider 540 in the longitudinal direction.

The movable side magnets are composed of a third magnet 563 coupled to the end surface of the rod 520 with facing the first magnet 561 of the fixed side magnets, and a fourth magnet 564 coupled to the stopper 532 with facing the second magnet 562 of the fixed side magnets.

The fixed side first magnet 561 and the movable side third magnet 563 have different poles each other, and the fixed side second magnet 562 and the movable side fourth magnet 564 have different poles each other.

Figure 4:
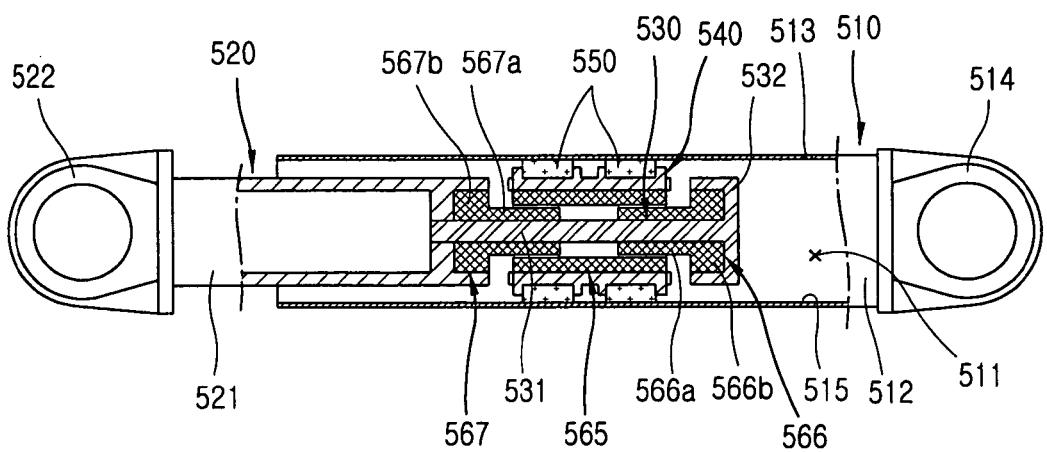
FIG. 4 is a front section view showing another embodiment of the combination type damper of the present invention.

As shown in FIG. 4, another embodiment of the pairs of magnets includes a fifth magnet 565 of a cylindrical shape coupled to the inner circumferential surface of the slider 540; a sixth magnet 566 coupled to the stopper 532 of the guide bar to be partially disposed to inside of one side of the fifth magnet 565; and a seventh magnet 567 coupled to the end surface of the rod 520 to be partially disposed to inside of another side of the fifth magnet 565.

The sixth and seventh magnets 566 and 567 are respectively composed of insertion portions 566a and 567a having a certain length and outer diameter to be inserted into the fifth magnet 565, and coupling portions 566b and 567b extendingly formed from the insertion portions 566a and 567a with steps. The poles of the sixth magnet 566 and the seventh magnet 567 are different from the pole of the fifth magnet 565.

Figure 5:
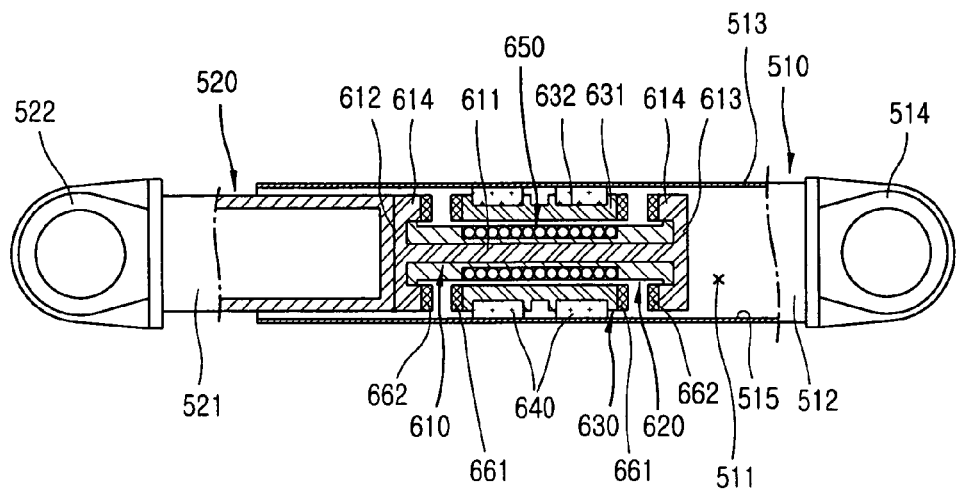
FIG. 5 is a front section view showing still another embodiment of the combination type damper of the present invention.

FIG. 5 is a front section view showing still another embodiment of the combination type damper of the present invention. The same reference numerals were given to the same parts as the aforementioned damper.

As shown, the composite damping means includes: a conductor guide 610 provided at the rod 520; a bobbin 620 coupled to the outer circumferential surface of the conductor guide 610; a conductor slider 630 movably inserted into the bobbin 620; a frictional member 640 coupled to the conductor slider 630 and adhered to the inner circumferential surface of the cylinder; a winding coil 650 wound on the bobbin 620 and for generating a repulsive force by an electromagnetic force between the conductor guide 610 and the conductor slider 630 according to an applied current; and magnetic pairs for inducing a repulsive pole between the conductor slider 630 and the conductor guide 610.

The conductor guide 610 includes: a guide portion 611 having a certain outer diameter and a length; a first disc portion 612 coupled to the rod 520 by being extendingly formed at one side of the guide portion 611 as a disc shape; a second disc portion 613 extendingly formed at another side of the guide portion 611 as a disc shape; and protrusion portions 614 respectively protruding at one side surfaces of the first and second disc portions 612 and 613 with facing each other. The conductor guide 610 is a conductor.

The bobbin 620 is formed as a cylindrical shape having a length corresponding to the length of the guide portion 611 of the conductor guide, and is coupled to the guide portion 611 of the conductor guide.

The winding coil 650 is formed accordingly as coil is wound on a certain region of the outer circumferential surface of the bobbin 620.

The conductor slider 630 includes a cylindrical body 631 having a certain thickness and length, and a coupling groove 632 formed at the outer circumferential surface of the cylindrical body 631 and to which the frictional member 640 is coupled. The conductor slider 630 is movably inserted into outside of the bobbin 620 on which the coil is wound, and both ends of the conductor slider face the protrusion portions 614 of the conductor guide. The conductor slider 630 is a conductor, and the length thereof corresponds to a region of the winding coil 650.

The frictional member 640 is formed as a cylindrical shape having a certain thickness and length. The frictional member 640 is coupled to the coupling groove 632 to be adhered to the frictional surface 515 of the receiving space of the cylinder. When a relative movement distance between the cylinder 510 and the rod 520 is more than a preset distance, a frictional damping force operates between the frictional member 640 and the frictional surface 515.

The magnetic pairs are composed of fixed side magnets 661 coupled to the conductor slider 630, and movable side magnets 662 coupled to the conductor guide 610.

The fixed side magnets are respectively coupled to both ends of the conductor slider 630, and the movable side magnets are respectively coupled to the protrusion portions 614. The fixed side magnet 661 coupled to one end of the conductor slider 630 has a different pole from the opposite movable side magnet 662, and the fixed side magnet 661 coupled to another end of the conductor slider 630 has a different pole from the opposite movable side magnet 662.

Figure 6:
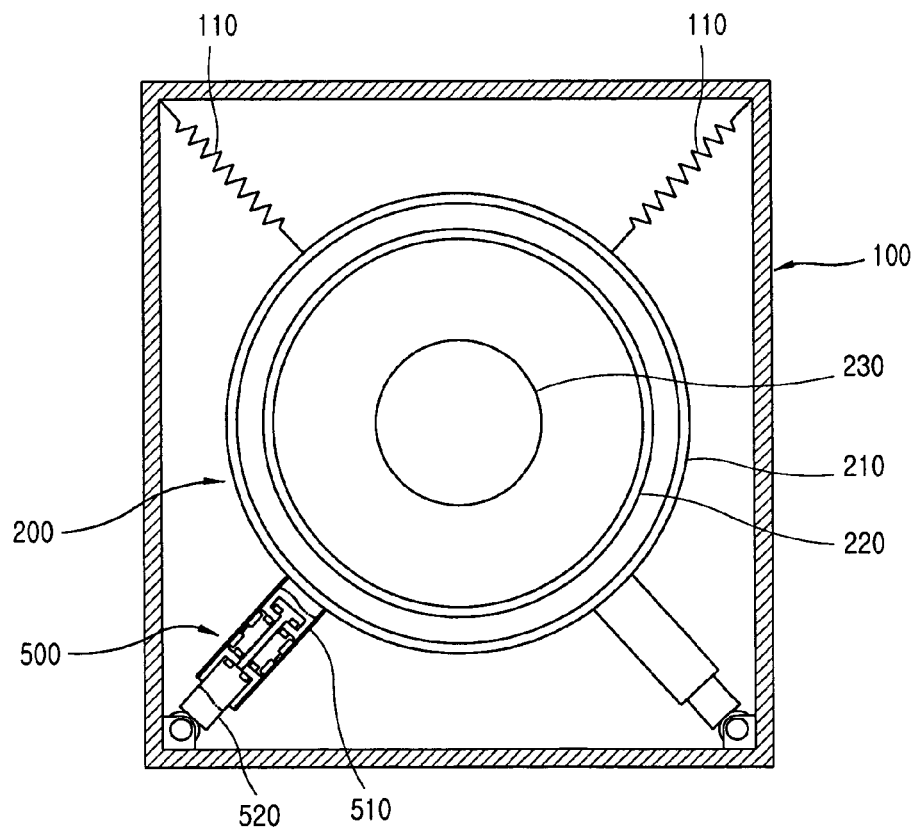
FIG. 6 is a front section view showing a washing machine having the combination type damper of the present invention.

FIG. 6 is a front section view showing a washing machine having the combination type damper of the present invention. The same reference numerals were given to the same parts as the conventional one.

As shown, the washing machine comprises: a cabinet 100 having an inner space of a predetermined shape; a tub assembly 200 disposed inside the cabinet 100; a spring 110 for connecting the upper portion of the tub assembly 200 and the cabinet 100; a cylinder 510 provided with a receiving space 511 having a certain depth at one side thereof and having another side coupled to the tub assembly 200; a rod 520 of which one side is relative-movably inserted into the receiving space 511 of the cylinder and another side is coupled to the cabinet 100; and a composite damping means for generating a damping force by an electromagnetic force when a displacement of a relative movement of the cylinder and the rod is less than a preset length, and for generating a frictional damping force when the displacement of the relative movement is more than the preset length.

The tub assembly 200 includes: a tub 210 disposed inside the cabinet 100; a drum 220 rotatably inserted into the tub 210 and into which laundry is introduced; and a driving motor 230 mounted at the rear surface of the tub 210 and for rotating the drum 220.

It is possible that one side of the cylinder 510 is coupled to the cabinet 100 and one side of the rod 520 is coupled to the tub assembly 200.

The cabinet 100 is provided with a water supply means (not shown) for supplying washing water into the tub 210, a drain means (not shown) for draining washing water inside the tub 210, and a door (not shown) for opening and closing the drum 220.

The composite damping means includes: a guide bar 530 provided at the rod; a slider 540 slidably inserted into the guide bar 530; a frictional member 550 coupled to the slider 540 and adhered to the inner circumferential surface of the cylinder 510; and magnetic pairs for generating a repulsive force at the time of movement of the slider 540. This composite damping means has the same construction as the aforementioned one.

The composite damping means includes: a conductor guide 610 provided at the rod 520; a bobbin 620 coupled to the outer circumferential surface of the conductor guide 610; a conductor slider 630 movably inserted into the bobbin 620; a frictional member 640 coupled to the conductor slider 630 and adhered to the inner circumferential surface of the cylinder 510; a winding coil 650 wound on the bobbin 620 and for generating a repulsive force by an electromagnetic force between the conductor guide 610 and the conductor slider 630 according to an applied current; and magnetic pairs for inducing a repulsive pole between the conductor slider 630 and the conductor guide 610. This composite damping means has the same construction as the aforementioned one. This composite damping means has the same construction as the aforementioned one.

Hereinafter, operational effects of the combination type damper and the washing machine having the same according to the present invention will be explained.

First, in case of the combination type damper, when steady state vibration is transmitted to the cylinder 510 from outside, the frictional surface 515 of the cylinder is in a state of being adhered to the frictional member 550. According to this, the slider 540, the frictional member 550, and the cylinder 510 become integral, so that the slider 540 performs a relative movement with the rod 510 and the guide bar 530 along the guide bar 530. At this time, a repulsive force operates between the fixed side magnets coupled to the slider 540, that is, the first and second magnets 561 and 562, and the movable side magnets coupled to the slider 540, that is, the third and fourth magnets 563 and 564. According to this, the slider 540 does not come in contact with the guide bar 530 and the rod but performs a relative movement. By this process, the steady state vibration transmitted to the cylinder 510 or the rod 520 is absorbed.

Also, when transient state vibration is transmitted to the cylinder 510 from outside, a displacement of a relative movement that the slider 540, the frictional member 550, and the cylinder 510 integrally move becomes great. According to this, a frictional damping force operates between the frictional surface 515 of the receiving space of the cylinder and the frictional member 550. That is, as the slider 540, the frictional member 550, and the cylinder 510 integrally move and at the same time the displacement of the relative movement has a length more than a preset length, the frictional surface 515 of the receiving space of the cylinder and the frictional member 550 perform a relative movement and a frictional damping force operates therebetween, thereby absorbing the transient state vibration. At this time, the fixed side magnets 561 and 562 coupled to the slider 540 do not collide with the movable side magnets 563 and 564 coupled to the guide bar 530 and the rod 520 by a repulsive force.

On the other hand, in case of the combination type damper to which an electromagnetic force is applied by the winding coil 650, when steady state vibration is transmitted to the cylinder 510 from outside, the frictional surface 515 of the cylinder is in a state of being adhered to the frictional member 640. According to this, the conductor slider 630, the frictional member 640, and the cylinder 510 become integral, so that the conductor slider 630 moves along the conductor guide 610 and at the same time performs a relative movement with the rod 520 and the conductor guide 610. At this time, a flux is generated by a current applied to the winding coil 650 and at the same time a repulsive force operates by poles respectively formed at the protrusion portions 614 of the conductor guide and both ends of the conductor slider 630. According to this, the conductor slider 630 and the conductor guide 610, that is, the bobbin, and the winding coil 650 do not come in contact with each other but perform a relative movement. By this process, the steady state vibration transmitted to the cylinder 510 or the rod 520 is absorbed.

The poles formed at the protrusion portions 614 of the conductor guide and both ends of the conductor slider 630 by the flux formed at the conductor guide 610 and the conductor slider 630 are determined by the magnets 661 and 662 respectively coupled to the conductor guide 610 and the conductor slider 630. The pole formed at the protrusion portions 614 of the conductor guide is different from the pole formed at both ends of the conductor slider 630. The strength of the poles formed at the conductor guide 610 and the conductor slider 630 is determined by an applied current.

Also, when transient state vibration is transmitted to the cylinder 510 from outside, a displacement of a relative movement that the conductor slider 630, the frictional member 640, and the cylinder 510 integrally move becomes great. According to this, a frictional damping force operates between the frictional surface 515 of the receiving space of the cylinder and the frictional member 640. That is, as the conductor slider 630, the frictional member 640, and the cylinder 510 integrally move and at the same time the displacement of the relative movement has a length more than a preset length, the frictional surface 515 of the receiving space of the cylinder and the frictional member 640 perform a relative movement and a frictional damping force operates therebetween, thereby absorbing the transient state vibration. At this time, a current is supplied to the winding coil 650, and the conductor slider 630 does not collide with the conductor guide 610 by a repulsive force generated therebetween.

As said processes are repeated, the transient state vibration transmitted to the cylinder 510 or the rod 520 is absorbed.

In the combination type damper, transient state vibration and steady state vibration are all absorbed.

Said washing machine is operated by performing a washing operation, a rinsing operation, and a dehydration operation as a general one.

Among said operations, in a process for reaching a fast dehydration speed of a normal state and for stopping at the dehydration speed of a normal state, transient state vibration is generated from the tub assembly 200 and the vibration is transmitted to the combination type damper 500. When the transient vibration is transmitted to the combination type damper 500, as aforementioned, the combination type damper 500 is operated in a transient state vibration mode thus to absorb the transient state vibration, thereby minimizing a transmission of the transient state vibration generated from the tub assembly 200 to the cabinet 100.

Also, at the time of a washing operation or at the time of a dehydration operation of a normal state of a high speed, steady state vibration is generated from the tub assembly 200 and the vibration is transmitted to the combination type damper 500. When the steady state vibration is transmitted to the combination type damper 500, as aforementioned, the combination type damper 500 is operated in a steady state vibration mode thus to absorb the steady state vibration, thereby minimizing a transmission of the steady state vibration generated from the tub assembly 200 to the cabinet 100.

As described above, said washing machine absorbs both the transient state vibration and the steady state vibration generated from the tub assembly 200 during the entire processes thereby to minimize vibration noise generated from the cabinet 100 towards outside.

As aforementioned, in the combination type damper according to the present invention, the transient state vibration and the steady state vibration transmitted form other system are all absorbed by using the electromagnetic force and the frictional damping force thus to prevent the vibration from being transmitted to other components, thereby enhancing the stability and the reliability of a system to which the combination type damper is applied.

Also, according to the washing machine having the combination type damper of the present invention, the transient state vibration and the steady state vibration generated from the tub assembly during the entire processes for washing laundry are prevented from being transmitted to the cabinet, thereby minimizing vibration noise towards outside and thus enhancing the reliability of a product.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A combination damper comprising:
    a cylinder provided with a receiving space at one side thereof;
    a rod movably inserted into the receiving space of the cylinder; and
    a damping member including:
        magnetic pairs which provide repulsive electromagnetic damping force when a displacement of a relative movement of the cylinder and the rod is less than a preset length, and
        a frictional member which provides a frictional damping force when the displacement of the relative movement is more than the preset length.

2. A combination type damper comprising:
    a cylinder provided with receiving space having a certain depth at one side thereof;
    a rod relative-movably inserted into the receiving space of the cylinder; and
    a composite damping means for generating a damping force by an electromagnetic force when a displacement of a relative movement of the cylinder and the rod is less than a preset length, and for generating a frictional damping force when the displacement of the relative movement is more than the preset length, wherein the composite damping means includes:
    a guide bar provided at the rod;
    a slider slidably inserted into the guide bar;
    a frictional member coupled to the slider and adhered to an inner circumferential surface of the cylinder; and
    magnetic pairs for generating a repulsive force at the time of movement of the slider.

3. The damper of claim 2, wherein the frictional damping force between the frictional member and the inner circumferential surface of the cylinder operates when the displacement of the relative movement of the cylinder and the rod is more than a preset distance.

4. The damper of claim 2, wherein the magnetic pairs are composed of fixed side magnets coupled to the slider and movable side magnets coupled to the guide bar and the rod.

5. The damper of claim 4, wherein the fixed side magnets and the movable side magnets are arranged to face each other with respect to a direction of a relative movement of the cylinder and the rod.

6. The damper of claim 4, wherein the fixed side magnets and the movable side magnets are arranged to be overlapped and to face each other with respect to a direction of a relative movement of the cylinder and the rod.

7. A combination type damper comprising:
    a cylinder provided with receiving space having certain depth at one side thereof;
    a rod relative-movably inserted into the receiving space of the cylinder; and
    a composite damping means for generating a damping force by an electromagnetic force when a displacement of a relative movement of the cylinder and the rod is less than a preset length, and for generating a frictional damping force when the displacement of the relative movement is more than the preset length, wherein the composite damping means includes:
    a conductor guide provided at the rod;
    a bobbin coupled to the outer circumferential surface of the conductor guide;
    a conductor slider movably inserted into the bobbin;
    a frictional member coupled to the conductor slider and adhered to an inner circumferential surface of the cylinder;
    a winding coil wound on the bobbin and for generating a repulsive force by an electromagnetic force between the conductor guide and the conductor slider according to an applied current; and
    magnetic pairs for inducing a repulsive pole between the conductor slider and the conductor guide.

8. The damper of claim 7, wherein the repulsive force generated between the conductor guide and the conductor slider by the winding coil operates in proportion to a displacement of a relative movement.

9. The damper of claim 7, wherein the frictional damping force between the frictional member and the inner circumferential surface of the cylinder operates when the displacement of the relative movement of the cylinder and the rod is more than a preset distance.

10. The damper of claim 7, wherein a region of the winding coil corresponds to a length of the conductor slider.

11. The damper of claim 7, wherein the conductor guide includes:
    a guide portion having a certain outer diameter and a length;
    a first disc portion coupled to the rod by being extendingly formed at one side of the guide portion as a disc shape;
    a second disc portion extendingly formed at another side of the guide portion as a disc shape; and
    protrusion portions respectively protruding at one side surfaces of the first and second disc portions with facing each other.

12. The damper of claim 7, wherein the magnetic pairs are composed of fixed side magnets coupled to the conductor slider and movable side magnets coupled to the conductor guide.

13. A washing machine with a combination damper, the washing machine including a cabinet having an inner space of a predetermined shape and a tub positioned inside the cabinet and containing washing water, the damper comprising:
    a cylinder provided with a receiving space at one side thereof and having another side coupled to the cabinet or the tub;
    a rod of which one side is movably inserted into the receiving space of the cylinder and another side is coupled to the cabinet or the tub; and
    a damping member including magnetic pairs which provide a repulsive electromagnetic damping force when a displacement of a relative movement of the cylinder and the rod is less than a preset length, and a frictional member which provides a frictional damping force when the displacement of the relative movement is more than the preset length.

14. A washing machine with a combination type damper including cabinet having an inner space of a predetermined shape and a tub positioned inside the cabinet and containing washing water, comprising:

a cylinder provided with receiving space having a certain depth at one side thereof and having another side coupled to a cabinet or a tub;

a rod of which one side is relative-movably inserted into the receiving space of the cylinder and another side is coupled to the cabinet or the tub; and a composite damping means for generating a damping force by an electromagnetic force when a displacement of a relative movement of the cylinder and the rod is less than a preset length, and for generating a frictional damping force when the displacement of the relative movement is more than the preset length, wherein the composite damping means includes:

a guide bar provided at the rod;

a slider slidably inserted into the guide bar;

a frictional member coupled to the slider and adhered to the inner circumferential surface of the cylinder; and magnetic pairs for generating a repulsive force at the time of movement of the slider.

15. A washing machine with a combination type damper including a cabinet having an inner space of a predetermined shape and a tub positioned inside the cabinet and containing washing water, comprising:

a cylinder provided with receiving space having certain depth at one side thereof and having another side coupled to a cabinet or a tub;

a rod of which one side is relative-movably inserted into the receiving space of the cylinder and another side is coupled to the cabinet or the tub; and a composite damping means for generating a damping force by an electromagnetic force when a displacement of a relative movement of the cylinder and the rod is less than a preset length, and for generating a frictional damping force when the displacement of the relative movement is more than the preset length, wherein the composite damping means includes:

a conductor guide provided at the rod;

a bobbin coupled to the outer circumferential surface of the conductor guide;

a conductor slider movably inserted into the bobbin;

a frictional member coupled to the conductor slider and adhered to the inner circumferential surface of the cylinder;

a winding coil wound on the bobbin and for generating a repulsive force by an electromagnetic force between the conductor guide and the conductor slider according to an applied current; and magnetic pairs for inducing a repulsive pole between the conductor slider and the conductor guide.

* * * * *